United States Patent
Vos et al.

(10) Patent No.: US 10,920,571 B2
(45) Date of Patent: *Feb. 16, 2021

(54) MEASUREMENT OF TORQUE WITH SHEAR STRESS SENSORS

(71) Applicant: Halliburton Energy Services, Inc., Houston, TX (US)

(72) Inventors: Andrew D. Vos, Spring, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,023

(22) Filed: Jul. 12, 2019

(65) Prior Publication Data

US 2021/0010879 A1 Jan. 14, 2021

(51) Int. Cl.
| | |
|---|---|
| *E21B 47/007* | (2012.01) |
| *G01L 3/10* | (2006.01) |
| *G01L 5/00* | (2006.01) |
| *G01L 3/06* | (2006.01) |
| *G01L 3/04* | (2006.01) |

(52) U.S. Cl.
CPC .............. *E21B 47/007* (2020.05); *G01L 3/04* (2013.01); *G01L 3/06* (2013.01); *G01L 3/10* (2013.01); *G01L 5/0042* (2013.01)

(58) Field of Classification Search
CPC ......... E21B 47/0006; G01L 3/06; G01L 3/04; G01L 5/0042; G01L 3/10
See application file for complete search history.

(56) References Cited

U.S. PATENT DOCUMENTS

| | | | |
|---|---|---|---|
| 3,304,528 A | * 2/1967 | Rastrelli | .................. G01L 1/20 338/2 |
| 3,827,294 A | 8/1974 | Anderson | |
| 3,855,857 A | * 12/1974 | Claycomb | ............... E21B 47/24 73/152.59 |
| 3,876,972 A | 4/1975 | Garrett | |

(Continued)

FOREIGN PATENT DOCUMENTS

| | | |
|---|---|---|
| EP | 1712890 A2 | 10/2006 |
| WO | 2008022960 A1 | 2/2008 |

(Continued)

OTHER PUBLICATIONS

Acknowledgement receipt and specification for patent application entitled "Lubricity Testing with Shear Stress Sensors," by Dale E. Jamison, et al., filed Jul. 12, 2019 as U.S. Appl. No. 16/510,002.

(Continued)

*Primary Examiner* — Taras P Bemko
*Assistant Examiner* — Jonathan Malikasim
(74) *Attorney, Agent, or Firm* — Conley Rose, P.C.; Rodney B. Carroll

(57) ABSTRACT

In some examples, a downhole torque measurement tool comprises a first surface of a structure and a second surface of the structure. The second surface is facing the first surface, and a shear stress sensor is positioned on the first surface. A flexible coupling is positioned between the shear stress sensor and the second surface, and the flexible coupling is coupled to the first and second surfaces.

5 Claims, 5 Drawing Sheets

(56) References Cited

U.S. PATENT DOCUMENTS

| | | | |
|---|---|---|---|
| 3,926,265 A * | 12/1975 | Bouyoucos | E21B 17/00 173/80 |
| 4,062,225 A | 12/1977 | Murphy, Jr. et al. | |
| 4,483,197 A | 11/1984 | Kellner | |
| 4,592,226 A | 6/1986 | Weber et al. | |
| 4,811,597 A * | 3/1989 | Hebel | E21B 47/0006 73/152.48 |
| 5,163,317 A | 11/1992 | Ono et al. | |
| 5,199,298 A | 4/1993 | Ng et al. | |
| 5,341,886 A | 8/1994 | Patton | |
| 5,386,724 A | 2/1995 | Das et al. | |
| 6,068,394 A | 5/2000 | Dublin, Jr. | |
| 6,341,532 B1 | 1/2002 | Xu et al. | |
| 6,418,776 B1 | 7/2002 | Gitis et al. | |
| 6,426,796 B1 | 7/2002 | Pulliam et al. | |
| 6,499,336 B1 | 12/2002 | Raffer | |
| 6,575,025 B1 | 6/2003 | Demia | |
| 6,629,451 B1 | 10/2003 | Taylor | |
| 6,817,223 B2 | 11/2004 | Lenz | |
| 7,234,517 B2 * | 6/2007 | Streich | E21B 33/12 166/250.01 |
| 7,311,009 B2 * | 12/2007 | Kotovsky | G01L 1/18 438/50 |
| 7,338,202 B1 | 3/2008 | Kapat et al. | |
| 7,526,941 B2 | 5/2009 | Doe | |
| 7,597,142 B2 | 10/2009 | Hartog et al. | |
| 7,701,586 B2 | 4/2010 | Otugen et al. | |
| 7,757,552 B2 * | 7/2010 | Bogath | E21B 17/16 73/152.49 |
| 8,375,771 B1 | 2/2013 | Bi | |
| 8,794,051 B2 | 8/2014 | Morgan et al. | |
| 8,991,489 B2 * | 3/2015 | Redlinger | E21B 4/02 166/242.6 |
| 9,175,557 B2 * | 11/2015 | Iversen | E21B 44/00 |
| 9,243,882 B2 | 1/2016 | Brookfield | |
| 9,376,906 B2 * | 6/2016 | Dalvi | G01V 11/002 |
| 9,625,333 B2 | 4/2017 | Jentoft et al. | |
| 9,771,790 B2 | 9/2017 | Clark et al. | |
| 10,024,776 B2 | 7/2018 | Khosla et al. | |
| 10,132,733 B2 | 11/2018 | Vinogradov-Nurenberg et al. | |
| 2002/0070050 A1 | 6/2002 | Wassell | |
| 2003/0154772 A1 | 8/2003 | Jackson | |
| 2004/0096614 A1 | 5/2004 | Quigley et al. | |
| 2004/0173009 A1 | 9/2004 | Doe et al. | |
| 2008/0092641 A1 * | 4/2008 | Cahill | B60T 8/52 73/121 |
| 2009/0013775 A1 | 1/2009 | Bogath et al. | |
| 2009/0188304 A1 | 7/2009 | Eskin et al. | |
| 2012/0319418 A1 | 12/2012 | Nishiwaki | |
| 2015/0021093 A1 | 1/2015 | Clark et al. | |
| 2016/0109348 A1 | 4/2016 | Robert et al. | |
| 2016/0349124 A1 | 12/2016 | Chang | |
| 2017/0022772 A1 | 1/2017 | Tolley et al. | |
| 2017/0122820 A1 | 5/2017 | Peng et al. | |
| 2018/0038780 A1 | 2/2018 | Yang et al. | |
| 2018/0252600 A1 | 9/2018 | Sheplak et al. | |

FOREIGN PATENT DOCUMENTS

| | | |
|---|---|---|
| WO | 2010144538 A2 | 12/2010 |
| WO | 2014150051 A1 | 9/2014 |

OTHER PUBLICATIONS

Acknowledgement receipt and specification for patent application entitled "Fluid Analysis Devices with Shear Stress Sensors," by Dale E Jamison, et al., filed Jul. 12, 2019 as U.S. Appl. No. 16/510,014.

Acknowledgement receipt and specification for patent application entitled "Measurement of Torque with Shear Stress Sensors," by Dale E Jamison, et al., filed Jul. 12, 2019 as U.S. Appl. No. 16/510,016.

Office Action dated Sep. 11, 2019 (20 pages), U.S. Appl. No. 16/510,016, filed Jul. 12, 2019.

Office Action dated Sep. 13, 2019 (25 pages), U.S. Appl. No. 16/510,002, filed Jul. 12, 2019.

Office Action dated Sep. 18, 2019 (19 pages), U.S. Appl. No. 16/510,014, filed Jul. 12, 2019.

Foreign Communication Regarding Related Application—International Search Report and Written Opinion of the International Searching Authority, International Application No. PCT/US2019/044471, dated Apr. 10, 2020, 9 pages.

Communication from Related Foreign Application—International Search Report and Written Opinion of the International Application No. PCT/US2019/044474, dated Apr. 9, 2020, 9 pages.

Office Action dated Apr. 15, 2020 (11 pages), U.S. Appl. No. 16/510,016, filed Jul. 12, 2019.

* cited by examiner

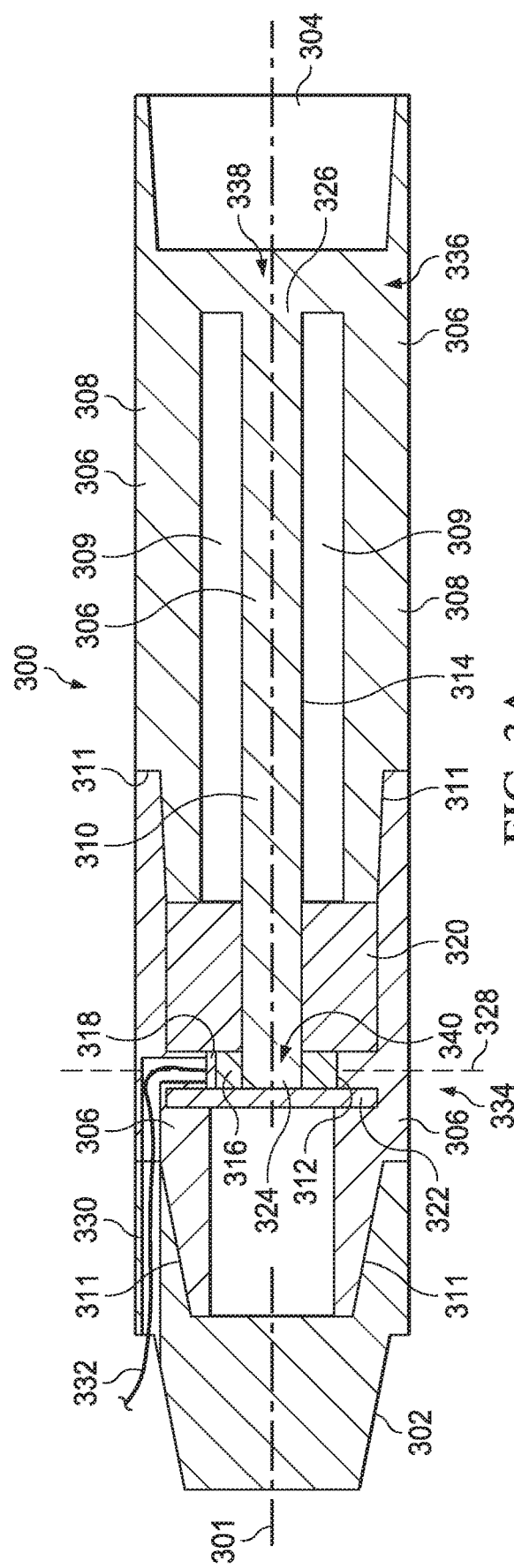
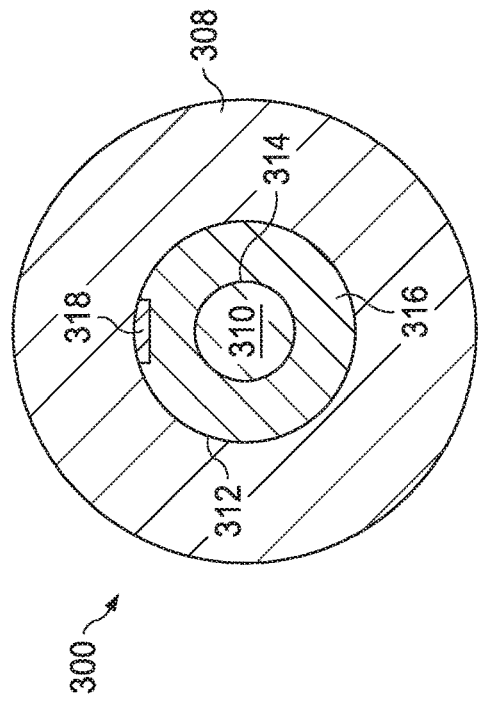
FIG. 3A
FIG. 3B

MEASUREMENT OF TORQUE WITH SHEAR STRESS SENSORS

BACKGROUND

In drilling wells for oil and gas exploration, various conditions can lead to excessive torque being applied to the drill string. For example, an excessive weight-on-bit can cause the drill bit to "catch" in the formation, resulting in a twisting motion on the drill string as the drill string attempts to continue rotating. In another example, a borehole cave-in can result in excessive drill string torque, particularly in horizontal wells.

BRIEF DESCRIPTION OF THE DRAWINGS

For a detailed description of various examples, reference will now be made to the accompanying drawings in which:

FIG. 3A is a cross-sectional view of a torque measurement tool along a longitudinal axis of the tool, in accordance with various examples.

FIG. 3B is cross-sectional view of a torque measurement tool orthogonal to a longitudinal axis of the tool, in accordance with various examples.

DETAILED DESCRIPTION

Disclosed herein are various examples of systems and techniques for measuring torque in downhole equipment using shear stress sensors, and, more particularly, MEMS shear stress sensors. In some examples, a MEMS shear stress sensor is mounted on a first surface of a torque measurement tool. A flexible coupling, such as silicone rubber, is positioned between the MEMS shear stress sensor and a second surface of the torque measurement tool. When torque is applied to the torque measurement tool such that the first and second surfaces are displaced relative to each other, the flexible coupling experiences shear stress, since it couples to both the first and second surfaces. A sensing surface of the MEMS shear stress sensor abuts the flexible coupling and thus senses the shear stress. The MEMS shear stress sensor measures this shear stress and provides a signal indicating the measured value to communication equipment (e.g., a telemetry sub, a wired drill pipe communication cable) or to storage. A computer subsequently processes the shear stress value encoded in the signal to calculate torque.

The system and techniques described herein confer multiple technical advantages. For instance, the torque calculation may be used to adjust drilling parameters (e.g., weight on bit), and it also may be used to identify and address potential structural deformities in the wellbore wall, such as narrow-well conditions or a cave-in. This may prevent overstressing the drill string beyond its torsional limit. A log may be maintained for torque values in different areas or depths of a well for future reference.

Figure 1:
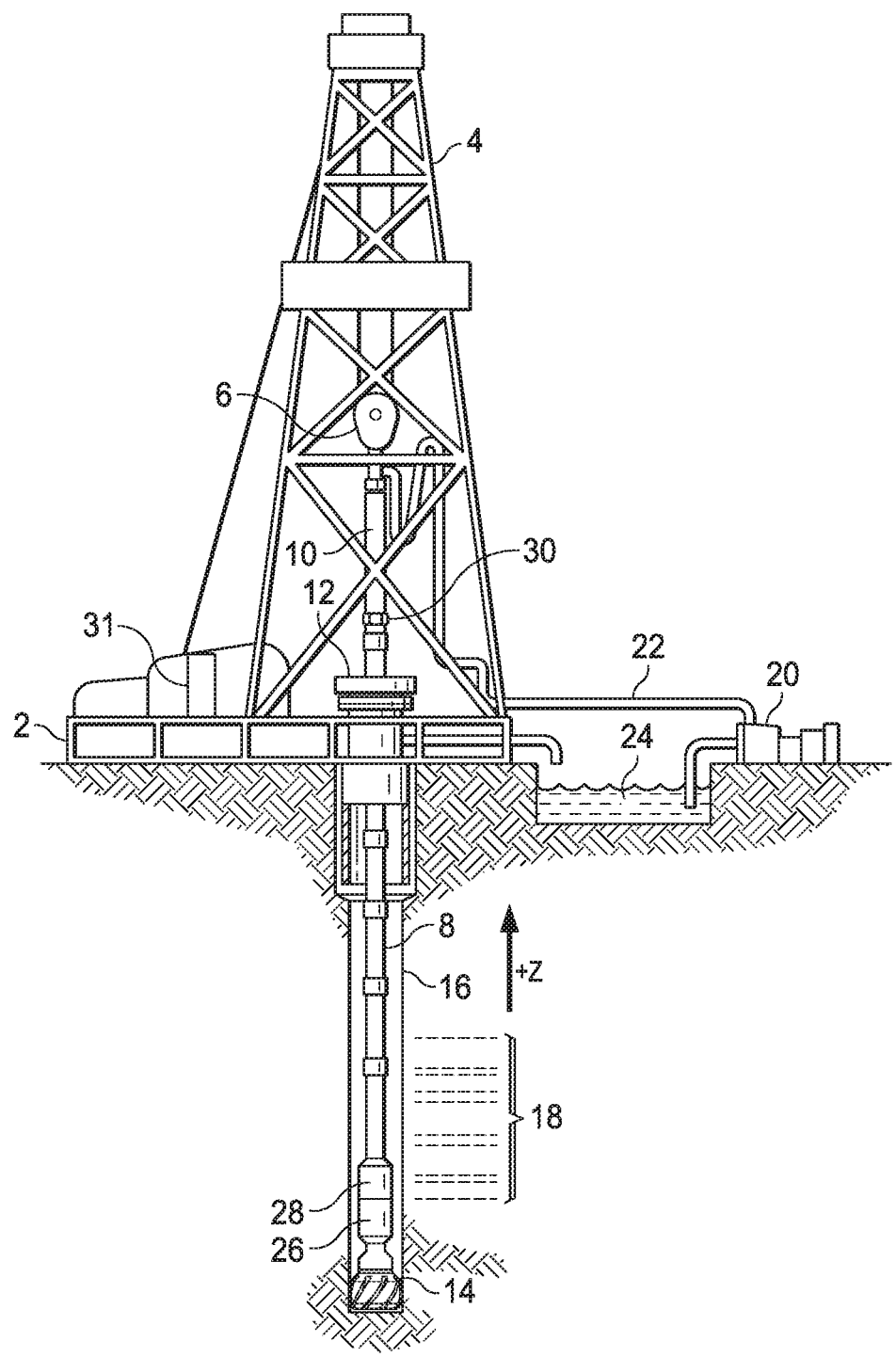
FIG. 1 is a side view of an illustrative logging while drilling (LWD) environment, in accordance with various examples.

FIG. 1 is a side view of an illustrative logging while drilling (LWD) environment, in accordance with various examples. A drilling platform 2 is equipped with a derrick 4 that supports a hoist 6 for raising and lowering a drill string 8. The hoist 6 suspends a top drive 10 suitable for rotating the drill string 8 and lowering the drill string through a well head 12. Connected to the lower end of the drill string 8 is a drill bit 14. As the drill bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via an annulus around drill string 8, and into a retention pit 24. The drilling fluid transports cuttings from the borehole 16 into the retention pit 24 and aids in maintaining the integrity of the borehole 16. Various materials can be used for drilling fluid, including water-based and oil-based fluids.

An assembly of LWD tools 26 is integrated into the bottom-hole assembly near the drill bit 14. As the drill bit 14 extends the borehole 16 through the formations 18, each tool 26 may collect measurements relating to various formation properties, the tool orientation, and/or various other drilling conditions. As illustrated, the assembly of LWD tools 26 may take the form of one or more drill collars, i.e., thick-walled tubulars that provide weight and rigidity to aid the drilling process. (For the present discussion, the assembly of LWD tools 26 is expected to include a torque measurement tool, examples of which are described below.) The assembly of LWD tools 26 may include a telemetry sub 28 to transfer measurement data to a surface receiver 30 and to receive commands from the surface. In some examples, the telemetry sub 28 does not communicate with the surface, but rather stores logging data for later retrieval at the surface when the assembly of LWD tools 26 is recovered.

A computer 31 is coupled to the surface receiver 30 to receive, store, and optionally process and display the measurement data. As discussed further below, computers such as computer 31 include a processor coupled to a memory that stores executable code. The executable code embodies a method which is carried out by the computer when the executable code is executed by the processor. The computer 31 may provide a user interface that enables a user to interact with the executable code, e.g., by viewing and selecting configuration options, viewing results, and optionally repeating the method with different configuration parameters. In at least some examples, the computer 31 operates during the drilling process, enabling a user to analyze measurements in real time and, if desired, to adjust drilling parameters in a timely fashion. Some drillers may rely on logs displayed by the computer to perform geosteering—that is, to steer the borehole 16 relative to a formation bed boundary.

While LWD measurements are desirable because they enable measurements to be acquired while the formations 18 are less affected by fluid invasion, the drilling operations create a high-shock, continuous vibration environment with extended exposure to downhole temperatures and pressures, yielding conditions that are generally hostile to electronic instrumentation, telemetry, and logging tool sensor operations. Consequently, many operators may prefer to conduct at least some of the logging operations with wireline logging tools.

Figure 2:
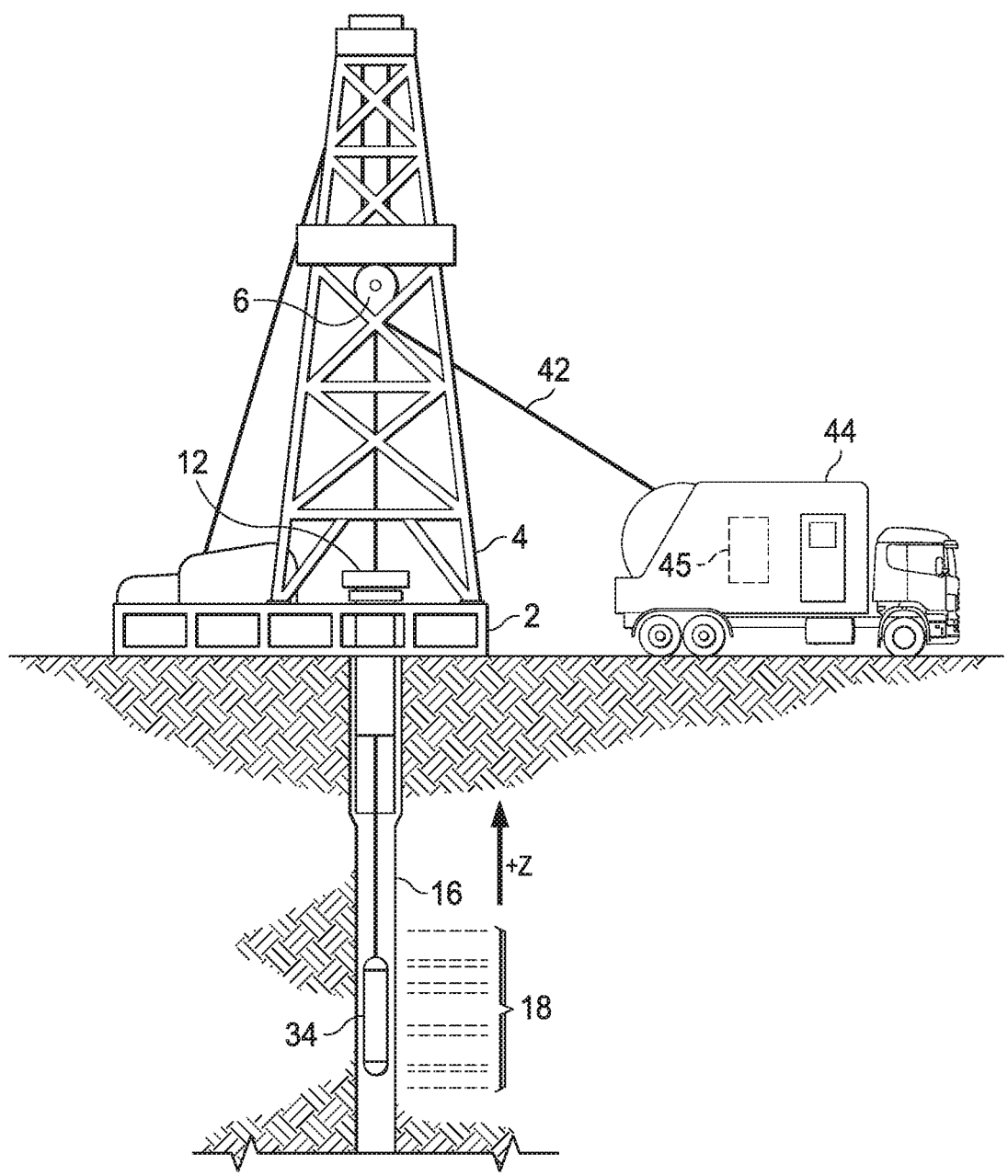
FIG. 2 is a side view of an illustrative wireline logging environment, in accordance with various examples.

FIG. 2 is a side view of an illustrative wireline logging environment, in accordance with various examples. In wireline logging, a sonde (i.e., an assembly of wireline logging tools 34) is lowered into the borehole 16. The assembly of wireline logging tools 34 is suspended at the end of a wireline cable 42 that provides mechanical support to the assembly of wireline logging tools 34 and also provides an electrical connection between the assembly of wireline logging tools 34 and electrical equipment located at the surface, such as a logging facility 44. Wireline cable 42 includes conductors for transporting power to the assembly of wireline logging tools 34 and telemetry from the assembly of wireline logging tools 34 to the logging facility 44. The assembly of wireline logging tools 34 may have pads and/or centralizing springs to maintain the assembly of wireline logging tools 34 near the axis of the borehole 16 as the assembly is pulled toward the surface. For the present discussion, the assembly of wireline logging tools 34 may include a torque measurement tool, examples of which are described below. (Although sondes typically may not experience the same degree of torque as drill strings, they still may experience lesser degrees of torque or axial stress—for example, when the clearance between the sonde and the borehole wall is small and there is a likelihood of the sonde catching on imperfections in the wall, possibly imparting a twisting motion on the body of the sonde.) Logging facility 44 collects measurements from the assembly of wireline logging tools 34, and it includes a computer 45 for processing and storing the measurements gathered by the wireline logging tools. As with computer 31, computer 45 includes a processor coupled to a memory that stores executable code, which may embody one or more of the methods described below.

The scope of this disclosure is not limited to implementation of the disclosed torque measurement tool in measurement-while-drilling (MWD)/LWD and wireline applications. Rather, the disclosed torque measurement tool may be implemented in any of a variety of contexts, including wired drill pipe, wired and unwired coiled tubing, slickline, downhole tractor, and subsea applications. Any and all such applications are contemplated and included within the scope of this disclosure.

FIG. 3A is a cross-sectional view of a torque measurement tool 300 along a longitudinal axis 301 of the tool, in accordance with various examples. The torque measurement tool 300, like the torque measurement tool 400 described below, may be deployed in any suitable part of a drill string or a sonde in which torque measurements are desired. The torque measurement tool 300 comprises a pin end 302 and a box end 304 to facilitate installation in a drill string or sonde. The torque measurement tool 300 comprises a structure 306 having multiple concentric shafts 308, 310. The term "structure" as used herein means any continuous member. The term "structure" is also used to refer to multiple members that are rigidly coupled to each other (e.g., using metal screws). The shaft 308 defines the outer body of the torque measurement tool 300, and the shaft 308 extends parallel to the longitudinal axis 301. The shaft 308 has a hollow cavity 309 that extends along the longitudinal axis 301 (e.g., along a center of the shaft 308). The shaft 310 is positioned within the hollow cavity 309 and extends along the longitudinal axis 301. The structure 306 includes multiple members rigidly coupled to each other, as fissures 311 indicate. The shaft 310 couples to the shaft 308 at an end 326 of the shaft 310. In some examples, the shaft 310 couples to the shaft 308 only at the end 326 of the shaft 310.

The structure 306 includes multiple surfaces, including a surface 312 and a surface 314. The surface 312 belongs to the shaft 308 and faces toward the longitudinal axis 301, while the surface 314 belongs to the shaft 310 and faces away from the longitudinal axis 301. A flexible coupling 316 is positioned in a portion of the hollow cavity 309, encircling an end 324 of the shaft 310, which opposes the end 326. The flexible coupling 316 couples to the surfaces 312 and 314 without the use of a separate adhesive. The flexible coupling 316 comprises any flexible material in which a shear stress may be detected and measured using a shear stress sensor, and in particular a micro-electro-mechanical system (MEMS) shear stress sensor. Examples of the flexible coupling 316 include: silicone rubber; urethane rubber; natural rubber (polyisoprene); styrene-butadiene-rubber; ethylene propylene diene monomer rubber (EPDM); butylrubber; polyurethane; NEOPRENE CR® (polychloroprene); hydrogenated nitrile; HYPALON® chlorosulphonated polyethylene; nitrile; VITON®; fluorosilicone; and fluorocarbon. Other examples are contemplated and included in the scope of this disclosure.

A shear stress sensor 318 (e.g., a MEMS shear stress sensor, such as a DIRECTSHEAR® sensor manufactured by IC²® of Gainesville, Fla.) is positioned on the surface 312, between the shaft 308 and the flexible coupling 316. In some examples, the shear stress sensor 318 abuts the flexible coupling 316. In some examples, the shear stress sensor 318 has a sensing surface that abuts the flexible coupling 316. Retention structures 320, 322 are positioned to prevent the inadvertent axial displacement of the flexible coupling 316. The retention structures 320, 322 do not directly couple to the shaft 310. The shaft 308 includes a channel 330 through which wires 332 connecting the shear stress sensor 318 to other electronics (e.g., a computer, a telemetry sub, wireless communication equipment, communication cables of a wired drill pipe) pass. Other communication techniques are contemplated, such as fiber optics, magnetic transmission, ultrasonic communication, radio communication, etc.

In an example operation, torque is applied to the torque measurement tool 300 such that an angular displacement is produced between locations 334 and 336 of the shaft 308. The positional displacement of the location 336 relative to location 334 is translated to location 338, which, in turn, is translated to location 340. Thus, the torque applied to the torque measurement tool 300 is characterized by the positional displacement between locations 334, 340. This causes shear stress to be applied to the flexible coupling 316, which couples to both surfaces 312, 314. The shear stress sensor 318 senses and measures this shear stress in the flexible coupling 316, converts the measured shear stress into an electrical signal, and outputs the electrical signal via the wires 332 in the channel 330. From there, the electrical signal may be stored in storage, transmitted wirelessly to the surface or to another tool, provided to a telemetry sub, provided to a computer, provided to communication cables in a wired drill pipe, carried via a wireline to the surface, etc. Other techniques for routing the electrical signals are contemplated and included in the scope of this disclosure.

In the example depicted in FIG. 3A, the shear stress sensor 318 is positioned on the surface 312. In other examples, the shear stress sensor 318 is positioned on the surface 314, with the channel 330 and wires 332 re-configured appropriately to facilitate the routing of electrical signals out of the torque measurement tool 300. For example, in such examples, the channel 330 and wires 332 may be routed down the length of the shaft 310 toward the box end 304 and up the length of the shaft 308 toward the pin end 302.

FIG. 3B is cross-sectional view of the torque measurement tool 300 along line 328 (FIG. 3A), in accordance with various examples. As explained above, the flexible coupling 316 is positioned between and coupled to the surfaces 312, 314. The shear stress sensor 318 is positioned on the surface 312, although in some examples, the shear stress sensor 318 is positioned on the surface 314. The relative positional displacement between shafts 308, 310 along line 328 (FIG. 3A) produces shear stress in the flexible coupling 316. The shear stress sensor 318 measures the shear stress, as described above.

Figures 4A, 4B, 4C:
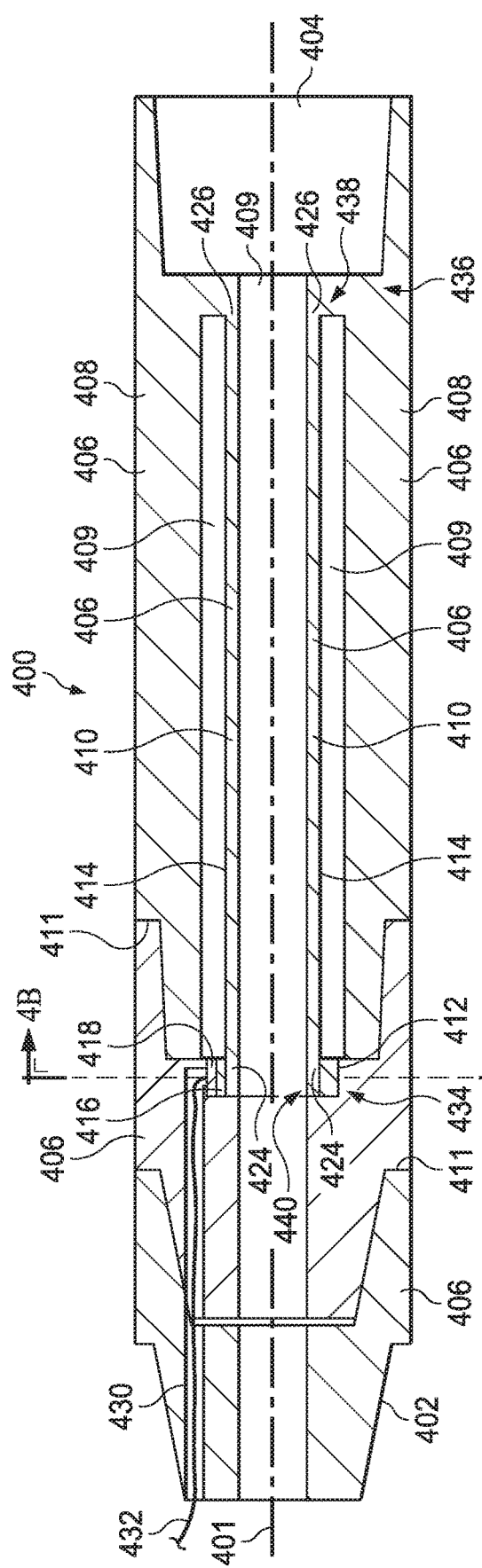
FIG. 4A is a cross-sectional view of a torque measurement tool along a longitudinal axis of the tool, in accordance with various examples.
FIGS. 4B and 4C are cross-sectional views of a torque measurement tool orthogonal to a longitudinal axis of the tool, in accordance with various examples.

FIG. 4A is a cross-sectional view of the torque measurement tool 400 along a longitudinal axis 401 of the tool 400, in accordance with various examples. The torque measurement tool 400 is similar to the torque measurement tool 300, except that the torque measurement tool 400 is configured to accommodate fluid flow and is thus suitable for use in portions of a drill string through which fluid (e.g., drilling mud) flows. The torque measurement tool 400 comprises a pin end 402 and a back end 404 to facilitate installation in a drill string or sonde. The torque measurement tool 400 comprises a structure 406 having multiple concentric shafts 408, 410, each of which is a hollow shaft. The shaft 408 defines the outer body of the torque measurement tool 400, and the shaft 408 extends parallel to the longitudinal axis 401. The shaft 408 has a hollow cavity 409 that extends along the longitudinal axis 401. In some examples, the hollow cavity 409 extends through the entire length of the torque measurement tool 400. The hollow shaft 410 is positioned within the hollow cavity 409 and extends along the longitudinal axis 401. The structure 406 includes multiple members rigidly coupled to each other, as fissures 411 indicate. The shaft 410 couples to the shaft 408 at an end 426 of the shaft 410. In some examples, the shaft 410 couples to the shaft 408 only at the end 426 of the shaft 410.

The structure 406 includes multiple surfaces, including a surface 412 and a surface 414. The surface 412 belongs to the shaft 408 and faces toward the longitudinal axis 401, while the surface 414 belongs to the shaft 410 and faces away from the longitudinal axis 401. A flexible coupling 416 is positioned in a portion of the hollow cavity 409, encircling an end 424 of the shaft 410, which opposes the end 426. The flexible coupling 416 couples to the surfaces 412 and 414 using any suitable adhesive material. The flexible coupling 416 comprises any flexible material in which a shear stress may be detected and measured using a shear stress sensor, and in particular a micro-electro-mechanical system (MEMS) shear stress sensor. Examples of the flexible coupling 416 include: silicone rubber; urethane rubber; natural rubber (polyisoprene); styrene-butadiene-rubber; ethylene propylene diene monomer rubber (EPDM); butylrubber; polyurethane; NEOPRENE CR® (polychloroprene); hydrogenated nitrile; HYPALON® chlorosulphonated polyethylene; nitrile; VITON®; fluorosilicone; and fluorocarbon. Other examples are contemplated and included in the scope of this disclosure.

A shear stress sensor 418 (e.g., a MEMS shear stress sensor, such as a DIRECTSHEAR® sensor manufactured by IC²® of Gainesville, Fla.) is positioned on the surface 412, between the shaft 408 and the flexible coupling 416. In some examples, the shear stress sensor 418 abuts the flexible coupling 416. In some examples, the shear stress sensor 418 has a sensing surface that abuts the flexible coupling 416. The shaft 408 includes a channel 430 through which wires 432 connecting the shear stress sensor 418 to other electronics (e.g., a computer, a telemetry sub, wireless communication equipment, communication cables of a wired drill pipe) pass.

In an example operation, torque is applied to the torque measurement tool 400 such that an angular displacement is produced between locations 434 and 436 of the shaft 408. The positional displacement of the location 436 relative to location 434 is translated to location 438, which, in turn, is translated to location 440. Thus, the torque applied to the torque measurement tool 400 is characterized by the positional displacement between locations 434, 440. This causes shear stress to be applied to the flexible coupling 416, which couples to both surfaces 412, 414. The shear stress sensor 418 senses and measures this shear stress in the flexible coupling 416, converts the measured shear stress into an electrical signal, and outputs the electrical signal via the wires 432 in the channel 430. From there, the electrical signal may be stored in storage, transmitted wirelessly to the surface or to another tool, provided to a telemetry sub, provided to a computer, provided to communication cables in a wired drill pipe, carried via a wireline to the surface, etc. Other techniques for routing the electrical signals are contemplated and included in the scope of this disclosure.

In the example depicted in FIG. 4A, the shear stress sensor 418 is positioned on the surface 412. In other examples, the shear stress sensor 418 is positioned on the surface 414, with the channel 430 and wires 432 re-configured appropriately to facilitate the routing of electrical signals out of the torque measurement tool 300. For example, in such examples, the channel 430 and wires 432 may be routed down the length of the shaft 410 toward the box end 404 and up the length of the shaft 408 toward the pin end 402.

FIG. 4B is cross-sectional view of the torque measurement tool 400 along line 428 (FIG. 4A), in accordance with various examples. As explained above, the flexible coupling 416 is positioned between and coupled to the surfaces 412, 414. The shear stress sensor 418 is positioned on the surface 412 (FIG. 4B), although in some examples, the shear stress sensor 418 is positioned on the surface 414 (FIG. 4C), which represents a cross-sectional view similar to FIG. 4B and having the alternative position of shear stress sensor 418 on the surface 414). The relative positional displacement between shafts 408, 410 along line 428 (FIG. 4A) produces shear stress in the flexible coupling 416. The shear stress sensor 418 measures the shear stress, as described above.

Figure 5:
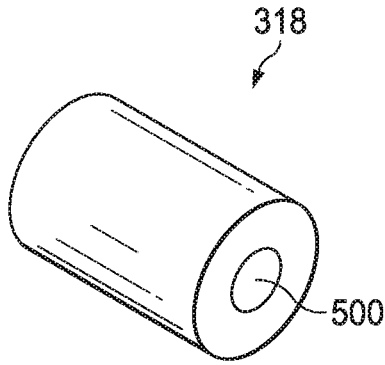
FIG. 5 is a perspective view of a shear stress sensor, in accordance with various examples.

FIG. 5 is a perspective view of the shear stress sensor 318 (e.g., a MEMS shear stress sensor) (FIGS. 3A and 3B), in accordance with various examples. The shear stress sensor 318 depicted in FIG. 5 is also representative of the shear stress sensor 418 implemented in FIGS. 4A and 4B. The shear stress sensor 318 includes a sensing surface 500 which, when abutting a flexible coupling (e.g., flexible couplings 316, 416), measures the shear stress present in the flexible coupling and outputs an electrical signal indicating the measured shear stress. As explained above, in some examples, the shear stress sensor 318 is a DIRECTSHEAR® sensor manufactured by IC²® of Gainesville, Fla. In some examples, the thickness of the shear stress sensor 318 as measured from the sensing surface 500 to the opposing, parallel surface of the shear stress sensor 318 is, e.g., less than or equal to 25 millimeters.

Figure 6:
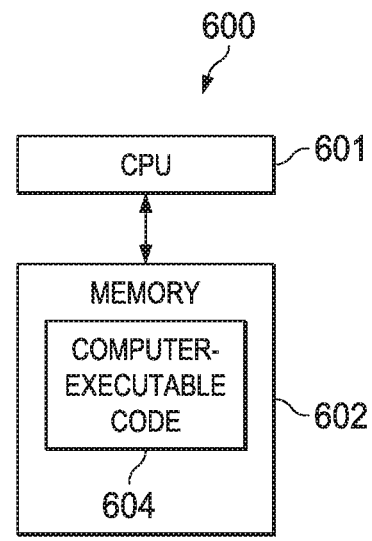
FIG. 6 is a schematic diagram of processing logic, in accordance with various examples.

FIG. 6 is a schematic diagram of processing logic 600 implemented in the computer 31 (FIG. 1) or the computer 45 (FIG. 2), in accordance with various examples. The processing logic 600 includes a central processing unit (CPU)

601 that couples to memory 602 (e.g., random access memory, read-only memory), as shown in FIG. 6. In at least some such examples, the memory 602 stores computer-executable code 604, which, when executed by the CPU 601, causes the CPU 601 to perform some or all of the functions described herein, including the functions described below with reference to FIG. 7. In some examples, the processing logic 600 comprises a field programmable gate array ("FPGA"), which may be programmed using an appropriate bitstream to cause it to perform some or all of the functions described herein. In some examples, the processing logic 600 comprises a combination of an FPGA and the components depicted in FIG. 6, with the combination operating in tandem to perform some or all of the functions described herein. Any and all such combinations are contemplated and included in the scope of this disclosure. In some examples, the processing logic 600 is positioned downhole, for example, in a telemetry sub. In some examples, the processing logic 600 is positioned at the surface such electrical signals from the torque measurement tool 300, 400 are communicated to the surface via telemetry and subsequently processed by the processing logic 600.

In some examples, the processing logic 600 receives electrical signals indicating measured shear stress in the aforementioned flexible couplings and calculates a torque value according to the equation $$T = \sigma A r k$$

where T is the torque, σ is the shear stress measurement, A is the sensor area, r is the distance from the center of the tool to the shear stress sensor, and k is the calibration constant for system stiffness. The torque value may be used to attain any number of technical advantages. For example, the torque calculation may be used to adjust drilling parameters (e.g., weight on bit), and it also may be used to identify and address potential structural deformities in the wellbore wall, such as a cave-in.

Figure 7:
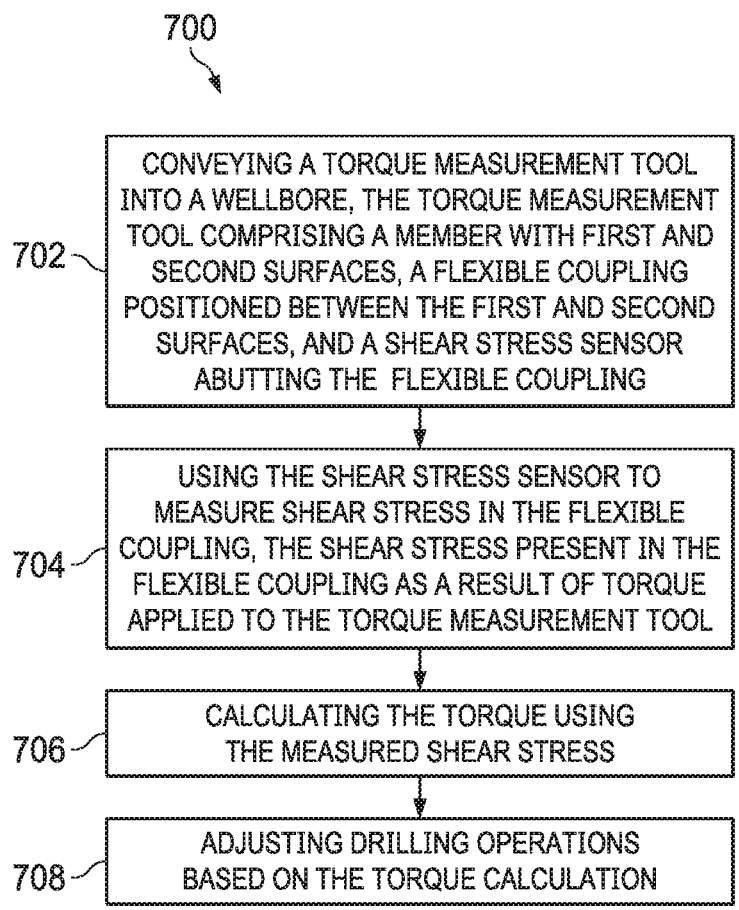
FIG. 7 is a flow diagram of an illustrative method to measure torque using a shear stress sensor, in accordance with various examples.

FIG. 7 is a flow diagram of an illustrative method 700 to measure torque using a torque measurement tool (and, more particularly, a MEMS shear stress sensor), in accordance with various examples. The method 700 begins by conveying a torque measurement tool into a wellbore (step 702). The torque measurement tool comprises a member with first and second surfaces, a flexible coupling positioned between the first and second surfaces, and a shear stress sensor abutting the flexible coupling. The method 700 further comprises using the shear stress sensor to measure shear stress in the flexible coupling, where the shear stress is present in the flexible coupling as a result of torque applied to the torque measurement tool (step 704). The method 700 also includes calculating the torque using the measured shear stress (step 706), and adjusting drilling operations based on the torque calculation (step 708). Any of the examples of torque measurement tools described herein may be used to perform at least some of the steps of the method 700, as may other examples that are not specifically described herein. Such examples include any torque measurement tools that apply the principle of torque and shear stress measurement using a shear stress sensor abutting a flexible coupling in a downhole tool.

In the foregoing discussion and in the claims, the terms "including" and "comprising" are used in an open-ended fashion, and thus should be interpreted to mean "including, but not limited to . . . ." Unless otherwise stated, "about," "approximately," or "substantially" preceding a value means+/−10 percent of the stated value. The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In some examples, a downhole torque measurement tool comprises a first surface of a structure; a second surface of the structure, the second surface facing the first surface; a shear stress sensor positioned on the first surface; and a flexible coupling positioned between the shear stress sensor and the second surface, the flexible coupling coupled to the first and second surfaces. The tool may be supplemented using one or more of the following concepts, in any order and in any combination: wherein the first surface faces toward a longitudinal axis of the tool, and wherein the second surface faces away from the longitudinal axis of the tool; wherein the second surface faces toward a longitudinal axis of the tool, and wherein the first surface faces away from the longitudinal axis of the tool; wherein the shear stress sensor comprises a micro-electro-mechanical-system (MEMS) shear stress sensor; wherein the flexible coupling is selected from the group consisting of: silicone rubber; urethane rubber; natural rubber; styrene-butadiene rubber; butylrubber; and combinations thereof; wherein the structure comprises multiple concentric shafts; wherein an exterior shaft of the multiple concentric shafts includes the first surface, and wherein an interior shaft of the multiple concentric shafts includes the second surface; wherein the first surface is on a first shaft of the structure, and wherein the second surface is on a second shaft of the structure, the first and second shafts coupling to each other only at one end of the second shaft.

In some examples, a downhole torque measurement tool comprises a first shaft having a hollow cavity extending parallel to a longitudinal axis of the first shaft; a second shaft positioned within the hollow cavity and extending parallel to the longitudinal axis of the first shaft, the first and second shafts forming a structure; a flexible coupling positioned within the hollow cavity and at least partially encircling the second shaft, the flexible coupling coupled to the first and second shafts; and a micro-electro-mechanical-system (MEMS) shear stress sensor abutting the flexible coupling. The tool may be supplemented using one or more of the following concepts, in any order and in any combination: wherein the flexible coupling couples to the first and second shafts at a first end of the second shaft, and wherein the first shaft couples to the second shaft at a second end of the second shaft, the second end opposing the first end; wherein the hollow cavity is in a center of the first shaft; wherein the hollow cavity extends through an entire length of the tool; further comprising a retention structure abutting the flexible coupling; wherein the MEMS shear stress sensor is mounted on the first shaft; wherein the MEMS shear stress sensor is mounted on the second shaft.

In some examples, a method comprises conveying a torque measurement tool into a wellbore, the torque measurement tool comprising a structure with first and second surfaces, a flexible coupling positioned between the first and second surfaces, and a shear stress sensor abutting the flexible coupling; using the shear stress sensor to measure shear stress in the flexible coupling, the shear stress present in the flexible coupling as a result of torque applied to the torque measurement tool; calculating the torque using the measured shear stress; and adjusting drilling operations based on the torque calculation. The method may be supplemented using one or more of the following concepts, in any order and in any combination: wherein the shear stress sensor comprises a micro-electro-mechanical system (MEMS) shear stress sensor; wherein the shear stress sensor is positioned on the first surface; wherein the shear stress sensor is positioned on the second surface; wherein the flexible coupling is selected from the group consisting of: ethylene propylene diene monomer rubber; polyurethane; polychloroprene; hydrogenated nitrile; nitrile; fluorosilicone; fluorocarbon; and combinations thereof.

What is claimed is:

1. A downhole torque measurement tool, comprising:
a lower cylindrical sub having a box end and a pin end;
an upper cylindrical sub having a box end, a pin end and an inner bore with an inner surface extending between the box end and the pin end,
wherein the box end of the upper cylindrical sub is connected to the pin end of the lower cylindrical sub;
wherein the lower cylindrical sub comprises an outer cylindrical shaft having a hollow cavity extending parallel to a longitudinal axis of the outer cylindrical shaft and an inner cylindrical shaft positioned within the hollow cavity and extending parallel to the longitudinal axis of the outer cylindrical shaft, the outer and inner cylindrical shafts each having a common end coupled together and forming a unitary structure at the box end of the lower cylindrical sub; and
wherein the inner cylindrical shaft has an extended end that extends a length greater than a length of the outer cylindrical shaft at the pin end of the lower cylindrical sub such that the extended end of the inner cylindrical shaft extends into the bore of the upper cylindrical sub and forms an annular space;
a flexible coupling positioned within the annular space and at least partially encircling the extended end of the inner cylindrical shaft, the flexible coupling coupled to the extended end of the inner cylindrical shafts; and
a micro-electro-mechanical-system (MEMS) shear stress sensor positioned within the annular space on the inner surface of the upper cylindrical sub and in contact with the flexible coupling, wherein relative positional displacement between the inner and outer shafts produces shear stress in the flexible coupling that is measured by the MEMS shear stress sensor.

2. The tool of claim 1, wherein the flexible coupling is selected from the group consisting of: silicone rubber; urethane rubber; natural rubber; styrene-butadiene rubber; butylrubber; and combinations thereof.

3. The tool of claim 1, wherein the inner cylindrical shaft comprises a bore.

4. The tool of claim 3, wherein the bore of the inner cylindrical shaft and the inner bore of the upper cylindrical sub extends through an entire length of the tool to allow fluid flow through the tool.

5. A method, comprising:
conveying the torque measurement tool of claim 1 into a wellbore;
using the shear stress sensor to measure shear stress in the flexible coupling, the shear stress present in the flexible coupling as a result of torque applied to the torque measurement tool;
calculating the torque using the measured shear stress; and
adjusting drilling operations based on the torque calculation.

* * * * *